H. R. DECKER.
ROTARY AND METHOD OF SECURING THE PIPE GRIPPING DEVICE THEREON.
APPLICATION FILED FEB. 27, 1911.
1,054,512. Patented Feb. 25, 1913.
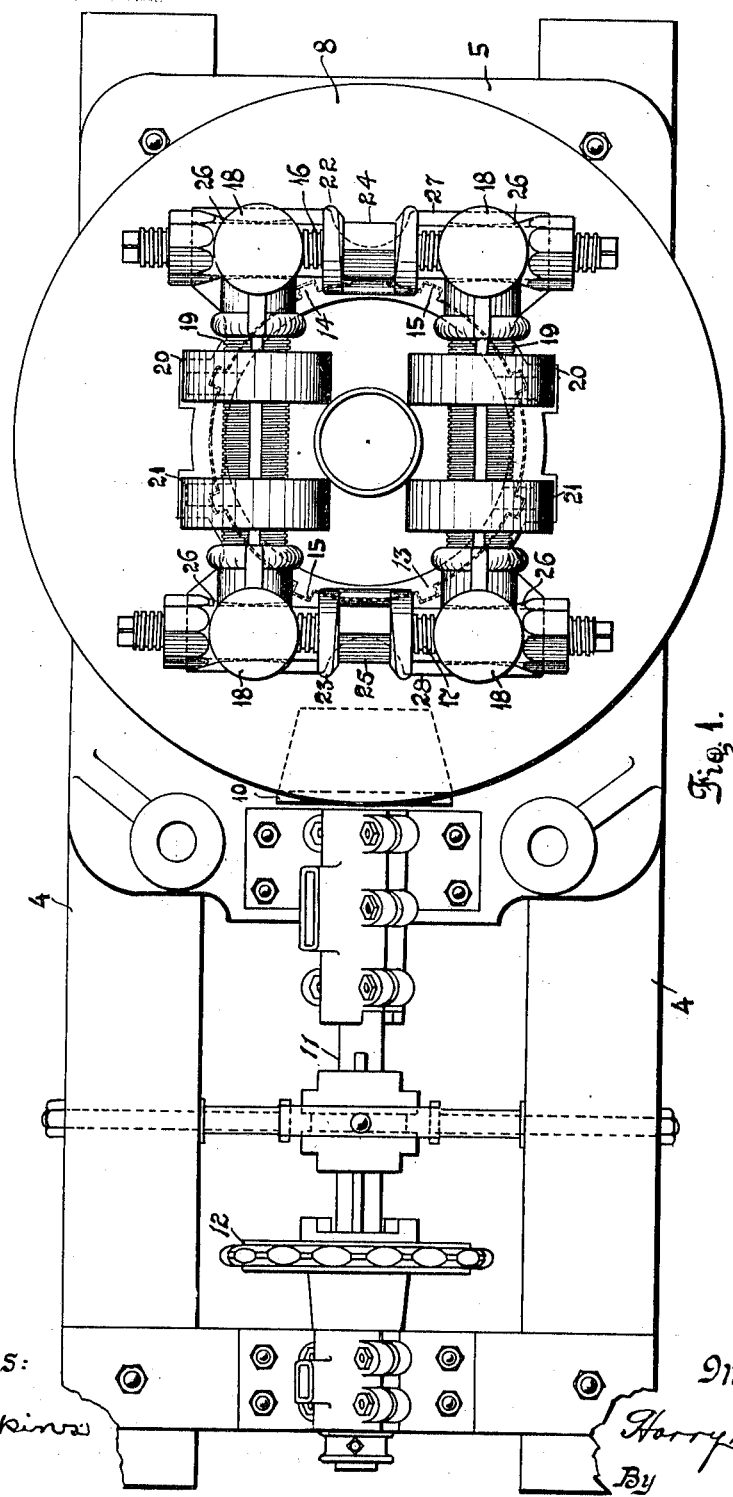

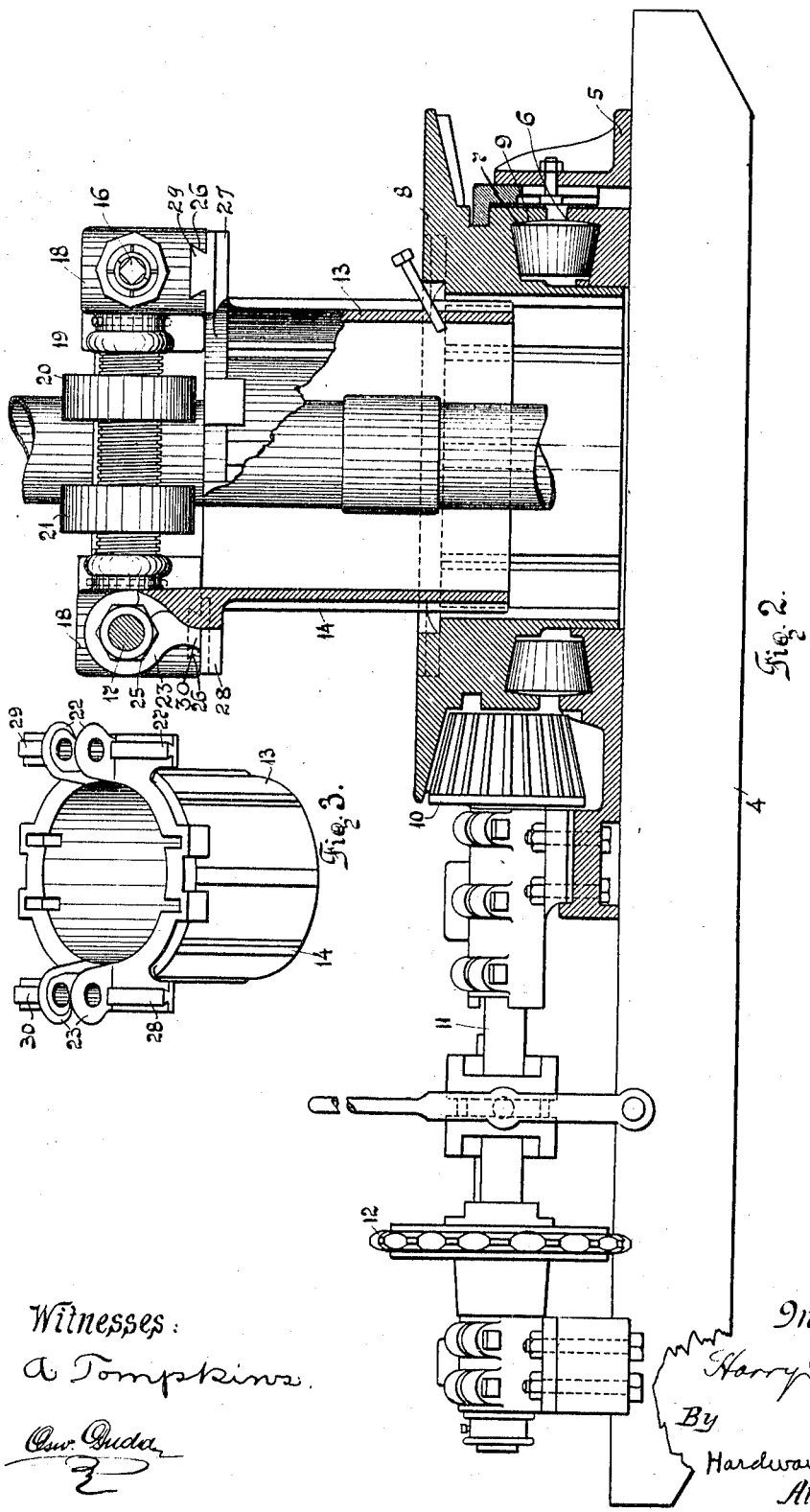

UNITED STATES PATENT OFFICE.

HARRY R. DECKER, OF HOUSTON, TEXAS.

ROTARY AND METHOD OF SECURING THE PIPE-GRIPPING DEVICE THEREON.

1,054,512. Specification of Letters Patent. Patented Feb. 25, 1913.

Application filed February 27, 1911. Serial No. 611.084.

*To all whom it may concern:*

Be it known that I, HARRY R. DECKER, a citizen of the United States, residing at Houston, in the county of Harris and State of Texas, have invented certain new and useful Improvements in Rotaries and the Method of Securing the Pipe-Gripping Device Thereon, of which the following is a specification.

My invention relates to new and useful improvements in rotaries and the method of securing the pipe gripping device thereon.

In devices of the character described the pipe gripping members are connected by connecting shafts, which pass through suitable supports carried by the rotary table, and it is a fact well known to those familiar with rotary drilling, that the power transmitted from the rotary table to the drill stem, or pipe, must be transmitted through said connecting shafts, and when hard strata are encountered the power, which must necessarily be transmitted, is often sufficient to bend or entirely break said connecting shafts.

It is the object of this invention to relieve the connecting shafts of this strain by means of a novel construction whereby, the rotation of the rotary table will be transmitted directly to the pipe gripping members.

With the above and other objects in view my invention has particular relation to certain novel features of construction and operation, an example of which is given in this specification and illustrated in the accompanying drawings, wherein:—

Figure 1 is a plan view of a complete rotary equipped with my improvement. Fig. 2 is a sectional side elevation thereof, and Fig. 3 is a perspective view of a means for supporting the pipe gripping device on the rotary table.

Referring more particularly to the drawings, wherein like numerals of reference designate similar parts in each of the figures, the numeral 4 designates the bed frame of the rotary, whereon is mounted the base plate 5 provided with the race way ring 6 which receives the antifriction rollers 7.

The numeral 8 refers to the rotary table which has, upon its under surface, the race way ring 9, which receives and seats on rollers 7. This table is driven by the bevel gear 10, rigidly mounted on shaft 11, and meshing with a bevel gear face on the under side of the rotary table. The shaft 11 is driven through the sprocket wheel 12, rigidly mounted thereon, and receiving power from a suitable motor (not shown). The drum 13 passes through the central opening of the rotary table and carries, upon its periphery, longitudinal ribs 14 which fit into corresponding grooves 15 in the inner wall of said table, and force the drum to rotate with the table.

The pipe gripping device includes two oppositely disposed pipe gripping members which are connected by suitable screw connecting shafts 16, and 17. Each gripping member is composed of two corner blocks, as 18, supporting a grip ring shaft 19 which carries the grip rings 20 and 21. Each of the screw connecting shafts has ends oppositely threaded and said ends have screw connections with the corresponding corner blocks so that by a suitable manipulation of the screw connecting shafts the gripping members may be spread or drawn together and the grip rings 20 and 21 loosened or tightened on the pipe. These corner blocks may be integral with or detachable from the grip ring shafts.

The drum 13 has at its upper end the pairs of opposite laterally diverging fingers 22 and 23 through which the respective screw shafts 16 and 17 pass and by which said screws are supported and held in position relative to the drum. The shafts 16 and 17 are enlarged into nuts 24 and 25 between their supporting fingers by means of which said shafts are turned.

The under side of the corner blocks 18 have dove tail grooves 26 the groove of each block alining with the groove of the corresponding block, and the drum 13 carries the oblong cross bars, or trackways, 27 and 28 which are integral with the said drum and arranged parallel and on opposite sides thereof. The bars 27 and 28 are, respectively, provided on their upper sides with tongues 29 and 30 conforming in shape to, and fitting into the grooves 26 of their corresponding corner blocks. These tongues and their corresponding grooves aline with the corresponding screw connecting shaft, on each side and as the screw shafts are manipulated the corner blocks move back and forth on their trackways. As shown in dotted lines in Fig. 1, the grooves 26 are narrowest at the center of the block and diverge slightly each way therefrom, so that the tongues 29 and 30 will have a swiveling movement relative to the blocks. This construction is provided so that the screw connecting shafts may be alternately manipulated and their blocks alternately spread or drawn together. This would not be possible were the said tongues made to fit closely in their grooves, without bending the bars carrying said tongues.

It is to be observed that the drum 13 is not essential but separate supports may be provided having fingers 22 and 23 at their upper ends thereof and carrying the respective cross-bars 27 and 28 for the purpose heretofore specified.

It is readily apparent that the rotation imparted to the pipe gripping device will be transmitted from the support therefor through the cross-bars 27 and 28 and the connecting shafts 16 and 17 will be entirely relieved of the stress to which they would be subjected were they required to transmit rotation from the rotary table to the pipe gripping device, and it is also obvious that that the pipe gripping device may be elevated relative to the rotary table and the pipe gripping members will at all times have a direct drive from said table.

What I claim is:—

1. In a device of the character described the combination with a rotary table; of a pipe gripping device carried thereby composed of suitable pipe gripping members, corner blocks supporting the same and connecting shafts connecting said corner blocks; supporting means engaging with said corner blocks and also with the rotary table and transmitting rotation from said table to said pipe gripping device.

2. In a device of the character described the combination with a rotary table: of a pipe gripping device carried thereby composed of suitable pipe gripping members, corner blocks supporting the same and connecting shafts connecting said corner blocks; a supporting member carried by a rotary table and suitable engaging means carried by said supporting member and engaging with said corner blocks and transmitting rotation from said table to said pipe gripping device.

3. In a device of the character described the combination with a rotary table; of a pipe gripping device carried thereby composed of suitable pipe gripping members, corner blocks supporting the same and connecting means connecting said corner blocks; a supporting member carried by the rotary table; and laterally extending bars carried by said supporting member and having a sliding engagement in grooves in said corner blocks.

4. In a device of the character described, the combination with a rotary table; of a pipe gripping device carried thereby, said gripping device being composed of pipe gripping members and means connecting the same; a supporting member engaging with the pipe gripping members and having slidable engagement with the rotary table and transmitting rotation from the latter to the former.

5. In a device of the character described, the combination with a rotary table; of a pipe gripping device carried thereby, composed of suitable pipe gripping members, corner blocks supporting the same and connecting shafts connecting said corner blocks; supporting means engaging with said corner blocks and having slidable engagement with the rotary table and transmitting rotation from said table to said pipe gripping device.

6. In a device of the character described the combination with a rotary table; of a pipe gripping device carried thereby, composed of suitable pipe gripping members and means connecting the same; a supporting member having slidable engagement with the rotary table and supporting said pipe gripping members, and laterally extending means carried by the supporting member and having slidable engagement with the pipe gripping members.

In testimony whereof I have signed my name to this specification in the presence of two subscribing witnesses.

HARRY R. DECKER.

Witnesses:
J. W. YEAGLEY,
A. TOMPKINS.

---

Copies of this patent may be obtained for five cents each, by addressing the "Commissioner of Patents, Washington, D. C."